United States Patent
Shimbo (10) Patent No.: US 7,363,335 B2
(45) Date of Patent: *Apr. 22, 2008

(54) MODULAR ARITHMETIC APPARATUS AND METHOD SELECTING A BASE IN THE RESIDUE NUMBER SYSTEM

(75) Inventor: Atsushi Shimbo, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/221,906

(22) Filed: Sep. 9, 2005

(65) Prior Publication Data

US 2006/0010190 A1   Jan. 12, 2006

Related U.S. Application Data

(63) Continuation of application No. 10/051,280, filed on Jan. 22, 2002, now Pat. No. 7,010,560.

(30) Foreign Application Priority Data

Jan. 22, 2001   (JP) .............. 2001-013564

(51) Int. Cl.
*G06F 7/38* (2006.01)
(52) U.S. Cl. .................................. 708/491
(58) Field of Classification Search ......... 708/491–492
See application file for complete search history.

(56) References Cited

U.S. PATENT DOCUMENTS

| | | | |
|---|---|---|---|
| 3,602,704 A * | 8/1971 | Akushsky et al. ........ 708/532 |
| 4,366,549 A | 12/1982 | Katayama | |
| 4,949,294 A * | 8/1990 | Wambergue ............... 708/491 |
| 5,008,668 A * | 4/1991 | Takayama et al. .......... 341/83 |
| 5,077,793 A | 12/1991 | Falk et al. | |
| 5,623,423 A * | 4/1997 | Lipovski .................... 708/203 |
| 6,148,034 A | 11/2000 | Lipovski | |
| 6,240,436 B1 | 5/2001 | McGregor | |
| 6,366,940 B1 | 4/2002 | Ono et al. | |
| 6,434,585 B2 | 8/2002 | McGregor et al. | |
| 6,557,020 B1 | 4/2003 | Amano et al. | |
| 6,639,948 B1 * | 10/2003 | Tager ......................... 708/300 |
| 6,662,201 B1 | 12/2003 | Kawamura | |
| 6,704,834 B1 * | 3/2004 | Demeure et al. ............. 711/5 |

OTHER PUBLICATIONS

Khaled et al., Fast and Flexible Architectures for RNS Arithmetic Decoding, Apr. 1992, IEEE Transactions on Circuits and Systems-II: Analog and Digital Signal Processing, vol. 39, No. 4, pp. 226-235.*

(Continued)

*Primary Examiner*—Chat C. Do
(74) *Attorney, Agent, or Firm*—Finnegan, Henderson, Farabow, Garrett & Dunner, L.L.P.

(57) ABSTRACT

A modular arithmetic apparatus has a plurality of base parameter sets in read only memories. A base selection unit in the modular arithmetic apparatus selects one of the base parameters sets according to an input modulus p. A plurality of operation units 30, in the modular arithmetic apparatus, perform an arithmetic operation according to the selected base parameter set in parallel and obtain an arithmetic result.

16 Claims, 4 Drawing Sheets

OTHER PUBLICATIONS

Jean-Claude et al., "Modular Multiplication and Base Extensions in Residue Number Systems," IEEE (2001), pp. 59-65.

S. Kawamura et al., "Cox-Rower Architecture for Fast Parallel Montgomery Multiplication," Eurocrypt 2000, LNCS 1807, pp. 523-538.

Jean-Claude et al., "An RNS Montgomery Modular Multiplication Algorithm," IEEE Transactions on Computers (1998), 47:766-776.

K. Posch et al., "Modulo Reduction in Residue Number Systems," IEEE Transactions on Parallel and Distributed Systems (May 1995), 6:449-454.

Kenneth et al., "The Use of Residue Number Systems in the Design of Finite Impulse Response Digital Filters," IEEE Transactions on Circuits and Systems (1977), CAS-24:191-201.

* cited by examiner

| BASE SIZE n | UPPER LIMIT OF MODULUS SIZE |
|---|---|
| 22 | 672bit |
| 33 | 1024bit |
| 66 | 2080bit |

FIG. 5A

| BASE SIZE n | UPPER LIMIT OF MODULUS SIZE |
|---|---|
| 18(=9unit X 2) | 544bit |
| 27(=9unit X 3) | 832bit |
| 33(=11unit X 3) | 1024bit |
| 50(=10unit X 5) | 1568bit |
| 66(=11unit X 6) | 2080bit |

FIG. 5B

MODULAR ARITHMETIC APPARATUS AND METHOD SELECTING A BASE IN THE RESIDUE NUMBER SYSTEM

CROSS-REFERENCE TO RELATED APPLICATIONS

This application is a continuation of application Ser. No. 10/051,280, filed Jan. 22, 2002, now U.S. Pat. No. 7,010,560 which claims the benefit of priority to Japanese Patent Application No. 2001-013564, filed Jan. 22, 2001, all of which are incorporated herein by reference.

BACKGROUND OF THE INVENTION

1. Field of the Invention

The present invention relates to a modular arithmetic apparatus and method for performing an arithmetic operation of a large integer effectively by selecting a base (of a base size) in a plurality of base parameter sets in an arithmetic operation on the basis of a residue number system (RNS).

2. Description of the Related Art

The residue number system (RNS) is well known as one technique for efficiently performing operations involving large integers. In the residue number system, a set of small integers $\{a_1, a_2, \ldots, a_n\}$ that are prime to each other is prepared in advance. The set of integers $\{a_1, a_2, \ldots, a_n\}$ is called a base of the residue number system. Each element of the set of integers $\{a_1, a_2, \ldots, a_n\}$ is called a base element. The number n of base elements is called a base size.

In the case of expressing a large integer x in a residue number system, the large integer x is represented by a set of residues $\{x_1, x_2, \ldots, x_n\}$ obtained when the large integer x is divided by the respective base elements of a base $\{a_1, a_2, \ldots, a_n\}$. In this case, if the integer x is a positive integer that is smaller than the product $A (=a_1 a_2 \ldots a_n)$ of the base elements, then the integer x is uniquely represented by the residues $\{x_1, x_2, \ldots, x_n\}$. In other words, the integer x and its residue number system representation $\{x_1, x_2, \ldots, x_n\}$ correspond to each other one to one.

In a residue number system, the product of two integers x and y is calculated in the following manner. First, the products $\{x_1 y_1, x_2 y_2, \ldots, x_n y_n\}$ of the elements of a residue number system representation $\{x_1, x_2, \ldots, x_n\}$ of the integer x and the elements of a residue number system representation $\{y_1, y_2, \ldots, y_n\}$ of the integer y, respectively, are calculated. Then, residues $(x_1 y_1 \bmod a_1, x_2 y_2 \bmod a_2, \ldots, x_n y_n \bmod a_n\}$ are obtained by dividing the products $\{x_1 y_1, x_2 y_2, \ldots, x_n y_n\}$ by the base elements $a_i$ (i=1, 2, \ldots, n), respectively. Addition and subtraction can be performed in similar manners; an intended result is obtained by adding elements $x_i$ and $y_i$ corresponding to a base element $a_i$ or subtracting one from the other using the base element $a_i$ as a modulus.

As described above, in an operation using a residue number system, an intended result of each of multiplication, addition, and subtraction can be obtained by performing multiplication, addition, or subtraction independently on an element-by-element basis using a corresponding base element as a modulus. If the length of each base element is shorter than or equal to the word length of a computer, an operation involving very large integers can be performed by repeating single precision operations. This enables parallel processing in performing an operation (addition, subtraction, or multiplication) on large integers in a residue number system.

An algorithm obtained by combining the residue number system and the Montgomery multiplication and its hardware implementation (called "RNS Montgomery multiplier") are proposed, as a method for performing, at high speed, a modular exponentiation (and modular multiplication) that is a basic operation of the public key cryptosystem, in S. Kawamura, M. Koike, F. Sano, and A. Shimbo, "Cox-Rower Architecture for Fast Montgomery Multiplication," Lecture Notes in Computer Science 1807, Advances in Cryptology—EUROCRYPT 2000, pp. 523-538, 2000.

The RNS Montgomery multiplier uses a base to express an integer as a residue number system representation. The base is a set of small base elements whose lengths are shorter than or equal to an operation word length. The product of the base elements needs to have a length that is longer than or equal to the block size=key length, e.g., 1,024 bits) of a public key cryptosystem.

A method for performing operations in such a manner that the number of operation units of an RNS Montgomery multiplier is set equal to the base size and a method for performing operations in such a manner that the number of operation units is set equal to a divisor of base size and each operation unit is associated with a plurality of base elements are proposed in U.S. patent application Ser. No. 09-699,481 (Oct. 31, 2000).

The amount of calculation of the RNS Montgomery multiplication is proportional to the square of the base size (=n)used. The amount of calculation of the modular exponentiation corresponds to an amount of calculation of RNS Montgomery multiplications performed a number of times that is proportional to the bit length of an exponent.

Because of the recent advancement of decryption technology and diversification in the degree of security and other factors, the key length that is required in the public key cryptosystem is not necessarily fixed. Therefore, a single piece of hardware device needs to deal with a plurality of key lengths.

In hardware device implementation, the number of operation units provided in the hardware is fixed and the upper limit of the number of operation units that operate simultaneously is thereby determined. Therefore, in hardware device designing, it is necessary to determine key lengths to be handled and set the number of operation units at a proper number.

Where operation units are prepared in the same number as the base size that corresponds to a maximum key length, if modular exponetiations are performed while varying the key length, the amount of calculation decreases and the processing time can be shortened as the exponent becomes smaller. However, in view of the fact that the amount of calculation of a modular exponentiation in which binary representation is employed is proportional to the third power of the bit size (key length), the calculation amount varies to a large extent and the above processing time shortening effect is not sufficient.

Where the word size of each operation unit is equal to 32 bits, 65 base elements are necessary to deal with a key length of 2,048 bits in RSA (Rivest-Shamir-Adlemarl) type public key cryptsystem processing. The method of preparing base elements in a number corresponding to a maximum key length is inefficient because 65 base elements are excessive to perform modular exponentiation with a key length of 512 bits, for example.

However, no operation device configuration capable of operating efficiently for different key lengths has been provided yet in the art.

BRIEF SUMMARY OF THE INVENTION

Embodiments consistent with the present invention provide a modular arithmetic apparatus or method for performing an arithmetic operation of a large integer effectively by selecting a base size on the basis of a residue number system (RNS).

According to one embodiment of the present invention, there is provided a modular arithmetic apparatus for performing an arithmetic operation of an integer on the basis of a residue number system (RNS), comprising an input unit configured to input data included in modulus p, a plurality of operation units configured to perform residue operations in parallel to obtain the arithmetic result, each operation unit having a storage unit which stores at least a portion of a plurality of base parameter sets, each one of said base parameter sets containing a different number of base parameters and a selection unit configured to select one base parameter set in the plurality of base parameter sets according to the modulus p input from said input/output unit.

According to one embodiment of the present invention, there is provided a modular arithmetic apparatus for performing an arithmetic operation of an integer on the basis of a residue number system (RNS), comprising an input/output unit configured to input data included in modulus p, a plurality of operation units, each operation unit having a storage unit which stores at least a portion of a plurality of base parameter sets, each one of said base parameter sets containing a different number of base parameters, a selection unit configured to select one base parameter set in the plurality of base parameter sets according to the modulus p input from said input/output unit, said plurality of operation units configured to perform residue operations in parallel according to the selected one base parameter set and to obtain the arithmetic result and said input/output unit for configured to output the arithmetic result.

According to one embodiment of the present invention, there is provided a modular arithmetic apparatus for performing an arithmetic operation of an integer on the basis of a residue number system (RNS), comprising an input/output unit configured to input data included in modulus p and to output an arithmetic result, a storage unit configured to store at least a portion of a plurality of base parameter sets, each base parameter set comprises a set of base parameters indicating base elements, each one of said base parameter sets contains a different number of base parameters, a base selection unit configured to select one base parameter set in said storage unit according to the modulus p input from said input/output unit and a plurality of arithmetic units configured to perform operations in parallel according to the one base parameter set selected to obtain the arithmetic result.

According to one embodiment of the present invention, there is provided a modular arithmetic apparatus for performing an arithmetic operation of an integer on the basis of a residue number system (RNS), comprising an input/output unit configured to input data included in modulus p and to output an arithmetic result, storage means for storing at least a portion of a plurality of base parameter sets, each base parameter set comprises a set of base parameters indicating base elements, each one of said base parameter sets contains a different number of base parameters, a base selection means for selecting one base parameter set in said storage means according to the modulus p input from said input/output unit and, a plurality of arithmetic units configured to perform operations in parallel according to the one base parameter set selected to obtain the arithmetic result.

According to one embodiment of the present invention, there is provided a modular arithmetic apparatus for performing an arithmetic operation of an integer on the basis of a residue number system (RNS), comprising an input/output unit configured to input data included in modulus p and to output an arithmetic result, a plurality of storage units configured to store at least a portion of a plurality of base parameter sets, each base parameter set comprises a set of base parameters indicating base elements, each one of said base parameter sets contains a different number of base parameters, a base selection unit configured to select one base parameter set in said storage units according to the modulus p input from said input/output unit and, a plurality of arithmetic units configured to perform operations in parallel according to the one base parameter set selected to obtain the arithmetic result.

According to one embodiment of the present invention, there is provided a modular arithmetic method of performing an arithmetic operation of an integer on the basis of a residue number system (RNS) by a plurality of operation units in parallel, each operation unit having a storage unit which stores at least a portion of a plurality of base parameter sets each one of said base parameter sets contains a different number of base parameters each other, the method comprising inputting data included in modulus p, selecting one base parameter set in the plurality of base parameter sets according to the input modulus p, performing residue operations in parallel to obtain an arithmetic result and outputting the obtained arithmetic result.

According to one embodiment of the present invention, there is provided a modular arithmetic method of performing an arithmetic operation of an integer on the basis of a residue number system (RNS) by a plurality of operation units in parallel, the method comprising storing at least a portion of a plurality of base parameter sets to a storage unit, each base parameter set comprises a set of base parameters indicating base elements, each one of said base parameter sets contains a different number of base parameters, inputting data included in modulus p, selecting one base parameter set in said storage unit according to the input modulus p, performing operations in parallel by the plurality of operation units according to a set of base parameters indicating the one base parameter set selected and obtaining an arithmetic result and outputting the obtained arithmetic result.

DETAILED DESCRIPTION OF THE SEVERAL VIEWS OF THE DRAWINGS

An embodiment of the present invention will now be described with reference to the accompanying drawings.

Figure 1:
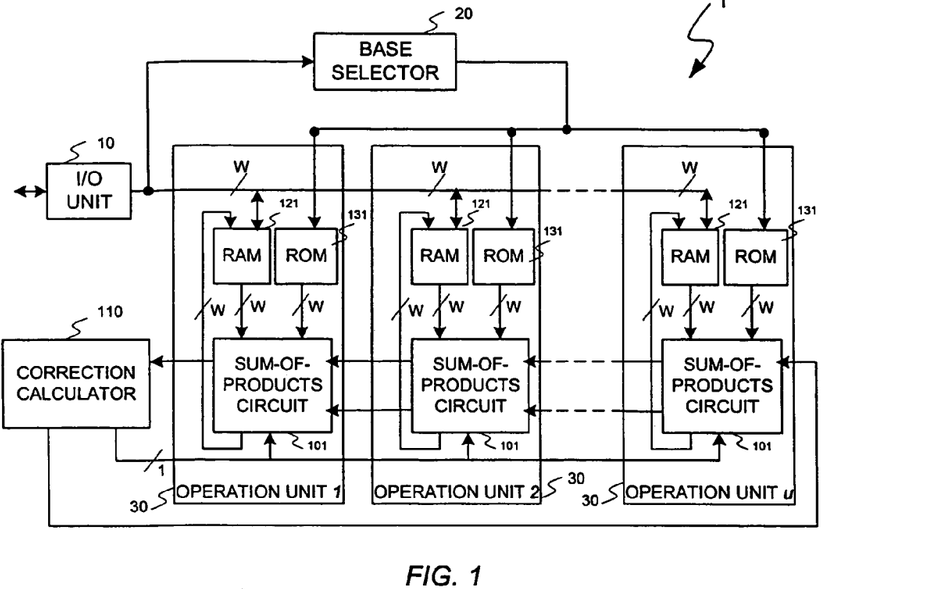
FIG. 1 is a block diagram showing the arrangement of a RNS Montgomery multiplier according to one embodiment of the present invention.

FIG. 1 is a block diagram showing the arrangement of an RNS Montgomery multiplier 1 according to one embodiment. A correction calculator 110 is a unit that is necessary to calculate correction terms in base transformation processing that is necessary inside the RNS Montgomery multiplier 1.

A plurality of operation units 30 are each provided with a sum-of-products circuit 101 having a residue operation function, a RAM 121, and a ROM 131. The operation units 30 are arranged in parallel. The sum-of-products circuit 101 is configured to perform a w-bit operation with a corresponding base element. Receiving data from the RAM 121 and the ROM 131 and controlled by the correction calculator 110, the sum-of-products circuit 101 performs a residue operation and sends a calculation result to the RAM 121 via a w-bit bus. The operation units 30 are connected to each other by a w-bit bus. The operation units 30 are also connected, via the same bus, to an I/O unit 10 that controls the input and output between the RNS Montgomery multiplier 1 and an external device.

A base selector 20 receives a modulus p value from the external device via the I/O unit 10. The base selector 20 selects, in accordance with the length of the input modulus p, a base parameter set to be used for operation processing from a plurality of base parameter sets that differ based on base size n. The base selector 20 sends an address indicating the selected base parameter set to each ROM 131.

A plurality of base parameter sets that differ due to base size n are stored in the ROMs 131 in advance. Each base parameter is based on each base element of a base. Each operation unit 30 is configured to operate based on the base parameter set corresponding to a base parameter set selected by the base selector 20.

Figure 2:
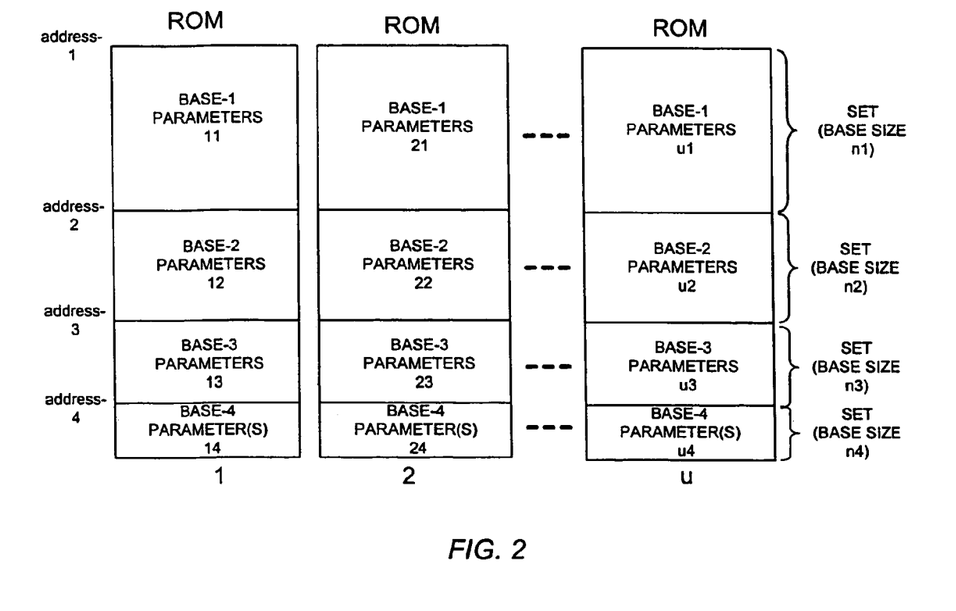
FIG. 2 shows base parameter sets stored in ROMs according to one embodiment of the present invention.

FIG. 2 shows four base parameter sets stored in the ROMs 131 separately according to the embodiment. The base-1 parameter set to the base-4 parameter set contain different base sizes. In this example, the base-1 parameter set comprises n1 base parameters (base parameters 11, base parameters 21 . . . and base parameters u1), the base-2 parameter set comprises n2 base parameters (base parameters 12, base parameters 22—and base parameters u2), the base-3 parameter set comprises n3 base parameters (base parameters 13, base parameters 23—and base parameters u3), and the base-4 parameter set comprises n4 base parameters (base parameters 14, base parameters 24—and parameters u4). The base selector 20 outputs one of address-1 to address-4 in the ROMs 131 corresponding to a selected base parameter set.

The base selector 20 selects a base parameter set having the smallest product value of base elements, that is, a base parameter set having the smallest base size, among base parameter sets having product values of base elements that are greater than a modulus p. In this embodiment, base parameter sets are stored in the ROMs 131, where the base sizes are multiples of the number of operation units 30, and one of the base parameter sets is used selectively in accordance with the length of an input modulus p (modulus length Lp).

Figure 3:
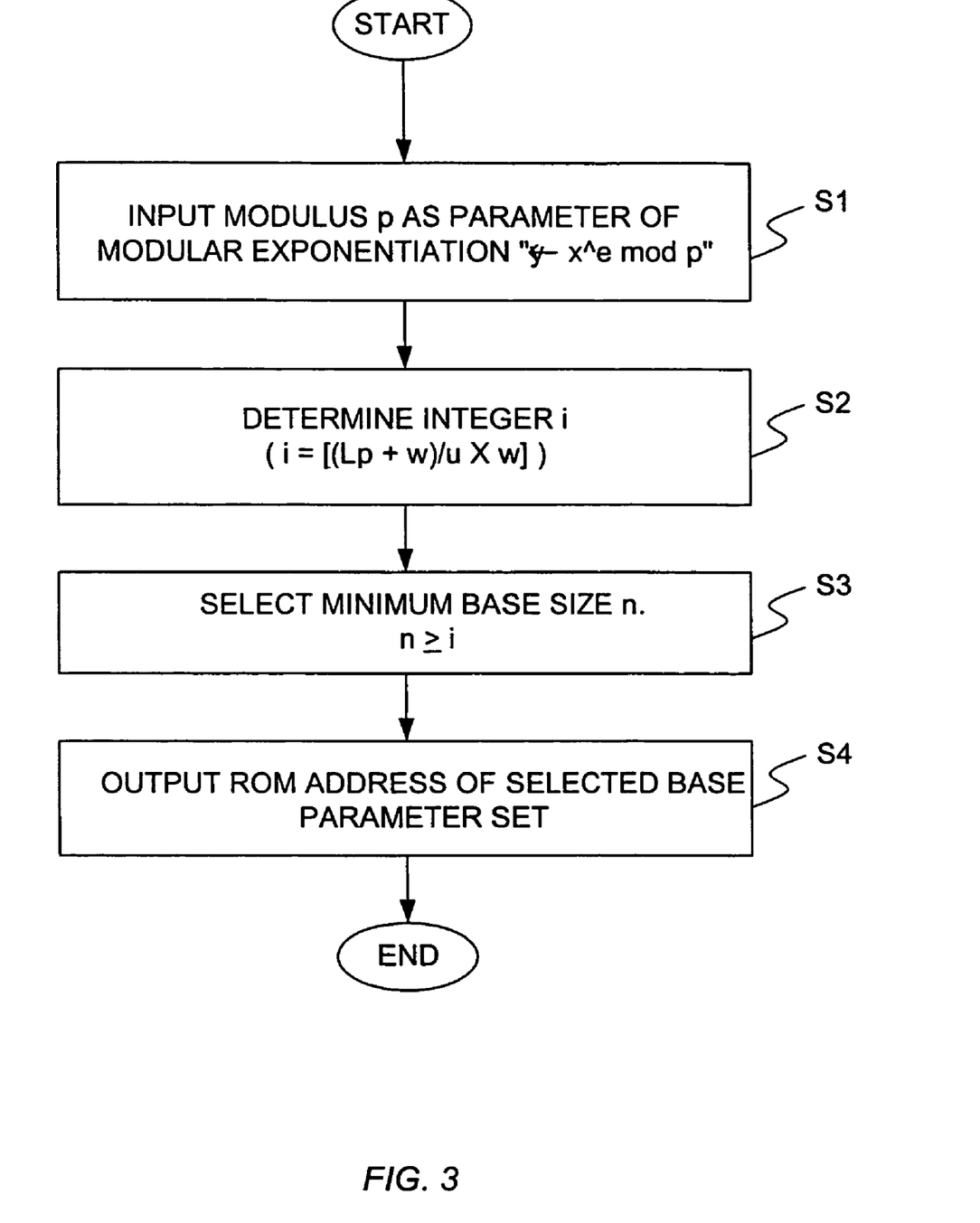
FIG. 3 is a flowchart showing an exemplary algorithm for selecting among base parameter sets according to one embodiment of the present invention.

FIG. 3 is a flowchart showing an exemplary algorithm for selection among such base parameter sets.

In step S1, a modulus p is input as a parameter of a modular exponentiation "y←$x^e$ mod p", for example.

In step S2, an integer i that satisfies the following formula is determined based on the input modulus length Lp, a bit length w of a word data in the operation units 30 that was determined when this RNS Montgomery multiplier 1 was designed, and the number u of operation units 30.

$$i=[(Lp+w)/(u \times w)]$$

where enclosing the expression within the brackets "[ ]" indicates a minimum integer greater than or equal to the expression.

In step S3, a minimum base size n that satisfies n≧i from the base parameter sets stored in the ROMs 131 is selected. Then, the base parameter set corresponding to the selected minimum base size n is selected.

In step S4, the base selector 20 outputs an address of the selected base parameter set in the ROMs 131.

A base parameter set is selected in this manner.

Figure 5A:
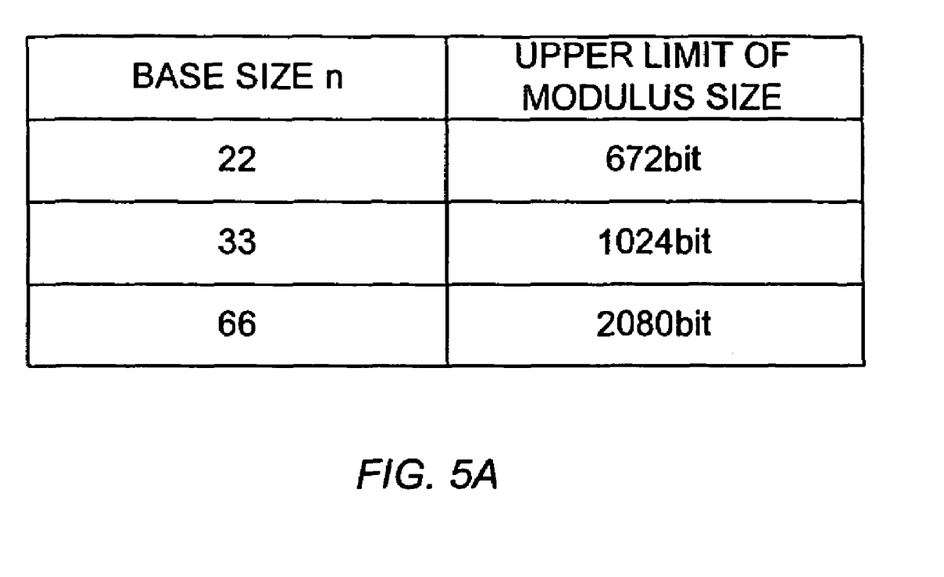
FIG. 5A and FIG. 5B show two exemplary tables showing the relationship between each base size and each upper limitation of modulus length.

If the number u of operation units 30 is equal to 11, selectable numbers of base elements are 11, 22, 33,—. In hardware implementation, an efficient operation can be processed by, for example, selecting 22, 33, and 66 as a number n of base elements if the modulus bit length is smaller than or equal to 672 bits, larger than 672 bits and smaller than or equal to 1,024 bits, and larger than 1,024 bits and smaller than or equal to 2,080 bits, respectively, as shown in FIG. 5A.

As in the above example, only part of the base sizes that are multiples of the number u of operation units 30 may be registered. The base selector 20 may be constructed by using a table that correlates base sizes with modulus size upper limits like FIG. 5A does.

Next, another embodiment using the RNS Montgomery 1 shown in FIG. 1 will be described. In this embodiment, the RNS Montgomery multiplier 1 is used in such a manner that the base size is set at a value that is greater than or equal to a minimum base size determined by the bit length of a modulus p and is a minimum value of respective multiples of 1 to the maximum number of operation units 30. A plurality of base parameter sets corresponding to the bit lengths of a plurality of modulus p are stored in the ROMs 131, and the base selector 20 selects from these base parameter sets in accordance with the bit length of a modulus p. In this embodiment, there may occur an operation unit that is not used.

Figure 4:
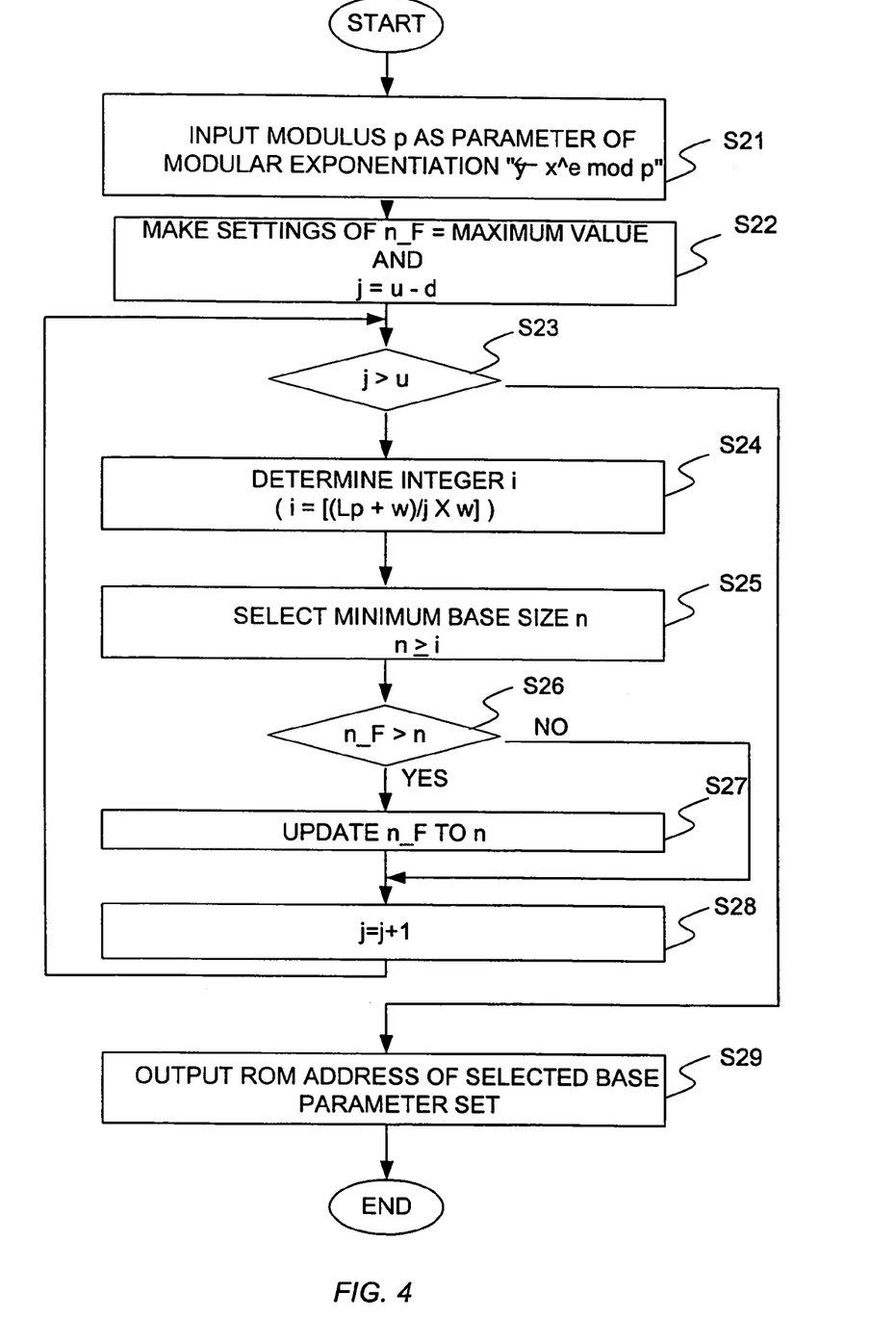
FIG. 4 is a flowchart showing an exemplary algorithm for selecting base parameter sets according to another embodiment of the present invention.

FIG. 4 is a flowchart showing an exemplary algorithm for selection of such a base parameter set.

In step S21, a modulus p is input as a parameter of a modular exponentiation "y←$x^e$ mod p", for example.

In step S22, variable n_F indicating the number of base elements is initially set at a maximum value (infinite) and variable j is initially set at u (the number of operation units 30)–d (a maximum number of units that is not used).

In step S23, it is judged whether variable j is larger than the number u of operation units 30 j>u). If variable j is larger than the number u of operation units 30, the process goes to step S29 as described later.

In step S24, if variable j is not greater than the number u of operation units 30, an integer i that satisfies the following formula is determined based on the bit length Lp of the input modulus p, a bit length w of a word data in the operation units 30 that was determined when this RNS Montgomery multiplier 1 was designed, and the number u of operation units 30.

$$i=[(Lp+w)/a \times w)]$$

where enclosing the expression within the brackets "[ ]" indicates a minimum integer greater than or equal to the expression.

In step S25, a minimum number n of base elements that satisfies n≧i from the numbers of base elements of the base parameter sets stored in the ROMs 131 is selected.

In step S26, it is judged whether variable n_F indicating the number of base elements is greater than the number n of base elements that was selected at step S25.

If the judgment result at step S26 is NO, the process goes to step S28, where variable j is incremented by 1. The process then returns to step S23. On the other hand, if the judgment result at step S26 is YES, the process goes to step S27, where variable n_F indicating the number of base elements is updated to the number n of base elements. At step S28, variable j is incremented by 1 and the process then returns to step S23.

At step S29, an address in the ROMs 131 of a base parameter set corresponding to the number n_F of base elements is outputted. The base selector 20 selects nothing for the ROMs 131 of an operation unit that is not used.

For example, when the number u of operation units 30 is 11 and the maximum number d of operation units 30 that is not used is 2, selectable numbers of base elements are 9, 10, 11, 18, 20, 22, 27, 30, 33, 36, 40, 44, 45, 50, 54, 55, 60, 66, . . . .

Figure 5B:
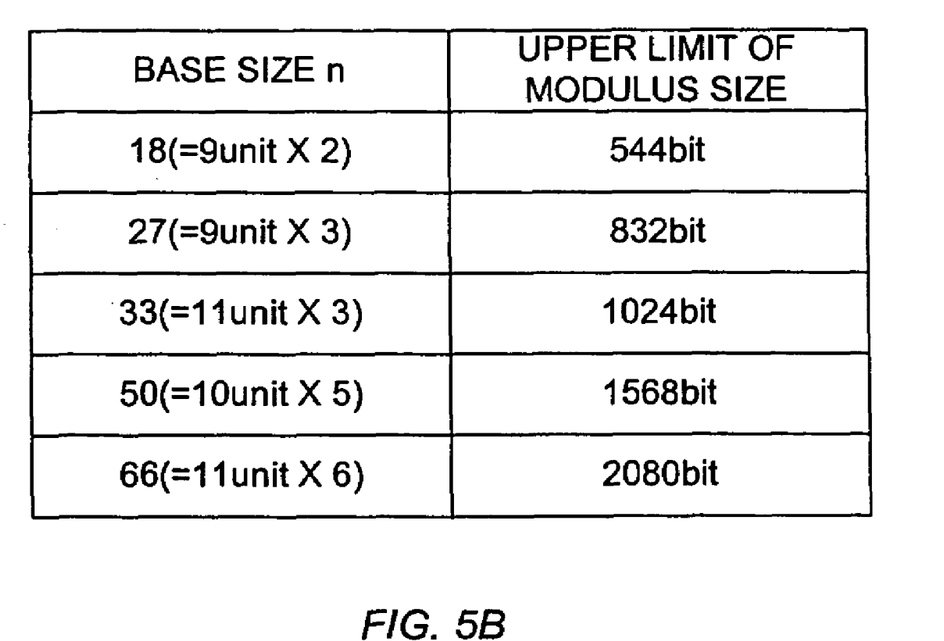

In hardware implementation, for example, 18 is selected as a number n of base elements if the bit length of the modulus p is smaller than or equal to 544 bits, as shown in FIG. 5B. In this case, nine of the 11 operation units 30 are used two times.

Twenty-seven (27) is selected as a number of base elements if the bit length of the modulus p is greater than 544 bits and smaller than or equal to 832 bits. In this case, nine of the 11 operation units 30 are used three times.

Thirty-three (33) is selected as a number of base elements if the bit length of the modulus p is greater than 832 bits and smaller than or equal to 1,024 bits. In this case, all the 11 operation units 30 are used three times.

Fifty (50) is selected as a number of base elements if the bit length of the modulus p is greater than 1,024 bits and smaller than or equal to 1,568 bits. In this case, ten of the 11 operation units 30 are used five times.

Sixty-six (66) is selected as a number of base elements if the bit length of the modulus p is greater than 1,568 bits and smaller than or equal to 2,080 bits. In this case, all the 11 operation units 30 are used six times.

The reason for fixing the number of operation units 30 is as follows. If the number of operation units 30 was made variable (e.g., the number of base elements is 50; calculation using 11 operation units 30 is performed four times and calculation using 6 operation units 30 is performed once), the varying number of operation units 30 would require complex control though the operation time would remain the same. An example of complex control required is such that each operation unit is controlled in such a manner as to operate with certain timing and not operate with another timing.

In the above embodiment, a plurality of base parameter sets are stored in the ROMs 131 in advance and the number of-operation units 30 and the numbers of operations are set indirectly by the above algorithm. Efficient operation processing can be realized by selecting a base parameter set in accordance with the bit length of a modulus p of an operation.

As in the above example, only part of the numbers of base elements that are multiples of the number u of operation units 30 may be registered. Alternatively, the base selector 20 may be constructed by using a table that correlates numbers of base elements with modulus p upper limits as in FIG. 5B.

As described above, a plurality of base parameter sets are provided in the ROMs 131 and the base selector 20 selects a proper base parameter set in accordance with the bit length of the modulus p. Therefore, an RNS Montgomery multiplier 1 using-residue number system representations that does not much influence hardware implementation and provides processing time shortening effects for different modulus p bit lengths can be provided.

The invention is not limited to the above embodiments and various modifications are possible. For example, although base parameters are stored to a plurality of ROMs 131 separately in the above-described embodiments, the base parameters may be stored to one unified ROM. In such case, each base parameter read from the unified ROM by a base selector 20 may be supplied to each operation unit 30 and may be stored to each of RAMs 121 in each operation unit 30 temporarily.

As described above, the invention can provide an operation device using residue number system representations that does not much influence hardware implementation and provides processing time shortening effects for different key lengths.

What is claimed is:

1. A modular arithmetic apparatus for performing an arithmetic operation of an integer for cryptology on a basis of a residue number system (RNS), comprising:
    an input unit configured to input data included in modulus p and to output an arithmetic result;
    a plurality of operation units configured to perform residue operations in parallel to obtain the arithmetic result, each operation unit having a storage unit which stores at least a portion of a plurality of base parameter sets, each one of said base parameter sets containing a different number of base parameters;
    a selection unit configured to select one base parameter set to be used for the residue operations performed by the plurality of operation units in the plurality of base parameter sets according to the modulus p input from said input unit; and
    a cryptosystem configured to provide a decrypted or encrypted output based on the arithmetic result.

2. The apparatus of claim 1, wherein said selection unit selects a minimum base parameter set from said base parameter sets, for which a product of base elements is larger than the modulus p.

3. A modular arithmetic apparatus for performing an arithmetic operation of an integer for security on a basis of a residue number system (RNS), comprising:
    an input/output unit configured to input data included in modulus p;
    a plurality of operation units, each operation unit having a storage unit which stores at least a portion of a plurality of base parameter sets, each one of said base parameter sets containing a different number of base parameters;
    a selection unit configured to select one base parameter set in the plurality of base parameter sets according to the modulus p input from said input/output unit;
    a cryptography unit;
    said plurality of operation units configured to perform residue operations in parallel according to the selected one base parameter set and to obtain an arithmetic result;

said input/output unit configured to output the arithmetic result; and said cryptography unit configured to provide a decrypted or encrypted output based on the arithmetic result.

4. The apparatus of to claim 3, wherein said selection unit selects a minimum base parameter set from said base parameter sets which indicate that values of a product of base elements are larger than the modulus p.

5. A modular arithmetic apparatus for performing an arithmetic operation of an integer for security on a basis of a residue number system (RNS), comprising:

an input/output unit configured to input data included in modulus p and to output an arithmetic result;

a storage unit configured to store at least a portion of a plurality of base parameter sets, each base parameter set including a set of base parameters indicating base elements, each one of said plurality of base parameter sets contains a different number of base parameters;

a base selection unit configured to select one base parameter set in said storage unit according to the modulus p input from said input/output unit;

a plurality of arithmetic units configured to perform operations in parallel according to the selected one base parameter set to obtain the arithmetic result; and a cryptographic unit configured to provide a decrypted or encrypted output based on the arithmetic result.

6. The apparatus of claim 5, wherein said base selection unit selects a minimum base parameter set from said base parameter sets, for which a product of base elements is larger than the modulus p.

7. The apparatus of claim 5, wherein the numbers of the base parameters of each base parameter set in said storage unit are multiples of the number of the arithmetic units, respectively.

8. The apparatus of claim 7, wherein said base selection unit selects a minimum base parameter set from said base parameter sets, from which a product of base elements is larger than the modulus p.

9. A modular arithmetic apparatus for performing an arithmetic operation of an integer for security on a basis of a residue number system (RNS), comprising:

an input/output unit configured to input data included in modulus p and to output an arithmetic result;

storage means for storing at least a portion of a plurality of base parameter sets, each base parameter set comprises a set of base parameters indicating base elements, each one of said plurality of base parameter sets contains a different number of base parameters;

a base selection means for selecting one base parameter set in said storage means according to the modulus p input from said input/output unit;

a plurality of arithmetic units configured to perform operations in parallel according to the selected one base parameter set to obtain the arithmetic result; and a cryptographic unit configured to provide a decrypted or encrypted output based on the arithmetic result.

10. The apparatus of claim 9, wherein said base selection means selects a minimum base parameter set from said base parameter sets, from which a product of base elements is larger than the modulus p.

11. A modular arithmetic apparatus for performing an arithmetic operation of an integer for security on a basis of a residue number system (RNS), comprising:

an input/output unit configured to input data included in modulus p and to output an arithmetic result;

a plurality of storage units configured to store at least a portion of a plurality of base parameter sets, each base parameter set including a set of base parameters indicating base elements, each one of said plurality of base parameter sets contains a different number of base parameters;

a base selection unit configured to select one base parameter set in said storage units according to the modulus p input from said input/output unit;

a plurality of arithmetic units configured to perform operations in parallel according to the selected one base parameter set to obtain the arithmetic result; and a cryptographic unit configured to provide a decrypted or encrypted output based on the arithmetic result.

12. The apparatus of claim 11, wherein said base selection unit selects a minimum base parameter set from said base parameter sets, from which a product of base elements is larger than the modulus p.

13. A modular arithmetic method of performing an arithmetic operation of an integer for security on a basis of a residue number system (RNS) by a plurality of operation units in parallel, the method comprising:

storing at least a portion of a plurality of base parameter sets to a storage unit, each base parameter set including a set of base parameters indicating base elements, each one of said plurality of base parameter sets contains a different number of base parameters inputting data included in modulus p;

selecting one base parameter set in said storage unit according to the input modulus p;

performing operations in parallel by the plurality of operation units according to a set of base parameters indicating the selected one base parameter set and obtaining an arithmetic result; and outputting a decrypted or encrypted output based on the arithmetic result.

14. The method of claim 13, wherein said selecting includes selecting a minimum base parameter set from said base parameter sets, for which a product of base elements is larger than the modulus p.

15. The method of claim 13, wherein the numbers of the base parameters of each base parameter set in said storage unit are multiples of the number of the operation units, respectively.

16. The method of claim 15, wherein said selecting step selects a minimum base from said base parameter sets, for which a product of base elements is larger than the modulus p.

* * * * *